United States Patent
Jeong et al.

(10) Patent No.: US 9,749,582 B2
(45) Date of Patent: Aug. 29, 2017

(54) DISPLAY APPARATUS AND METHOD FOR PERFORMING VIDEOTELEPHONY USING THE SAME

(71) Applicant: SAMSUNG ELECTRONICS CO., LTD., Suwon-si (KR)

(72) Inventors: Seong-wook Jeong, Seoul (KR); Jae-ki Kyoun, Yongin-si (KR); Chang-seog Ko, Hwaseong-si (KR); Sung-hyun Jang, Seoul (KR); Kwan-min Lee, Seoul (KR); Sang-hee Lee, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 14/708,719

(22) Filed: May 11, 2015

(65) Prior Publication Data
US 2015/0326822 A1   Nov. 12, 2015

(30) Foreign Application Priority Data
May 9, 2014   (KR) ........................ 10-2014-0055717

(51) Int. Cl.
| | |
|---|---|
| *H04N 7/15* | (2006.01) |
| *H04N 7/14* | (2006.01) |
| *G06F 3/01* | (2006.01) |
| *H04L 29/06* | (2006.01) |
| *H04M 3/56* | (2006.01) |

(52) U.S. Cl.
CPC ............ *H04N 7/147* (2013.01); *G06F 3/016* (2013.01); *G06F 3/017* (2013.01); *H04L 65/1059* (2013.01); *H04N 7/15* (2013.01); *H04M 3/567* (2013.01); *H04M 2201/50* (2013.01)

(58) Field of Classification Search
None
See application file for complete search history.

(56) References Cited

U.S. PATENT DOCUMENTS

| | | | |
|---|---|---|---|
| 9,083,848 B2 | 7/2015 | Ok | |
| 2001/0043163 A1* | 11/2001 | Waldern | G02B 5/1885 345/7 |

(Continued)

FOREIGN PATENT DOCUMENTS

| | | |
|---|---|---|
| KR | 101189053 B1 | 10/2012 |
| KR | 1020120126531 A | 11/2012 |

(Continued)

OTHER PUBLICATIONS

Communication dated Jun. 29, 2015, issued by the International Searching Authority in International Application No. PCT/KR2015/003437 (PCT/ISA/210).

(Continued)

*Primary Examiner* — Maria El-Zoobi
(74) *Attorney, Agent, or Firm* — Sughrue Mion, PLLC

(57) ABSTRACT

A display apparatus and method are provided. The display apparatus includes a videotelephony performer that is configured to perform a videotelephony with another display apparatus; and a controller configured to control a corresponding feedback that is output when gestures and speech of a user and the other party of the videotelephony have a preset correlation during a process in which the videotelephony is performed.

22 Claims, 12 Drawing Sheets

(56) References Cited

U.S. PATENT DOCUMENTS

| | | | |
|---|---|---|---|
| 2005/0093971 A1* | 5/2005 | Ono | H04N 7/15 348/14.09 |
| 2008/0297588 A1* | 12/2008 | Kurtz | H04N 7/147 348/14.08 |
| 2012/0026275 A1* | 2/2012 | Robinson | H04L 12/1827 348/14.03 |
| 2012/0206558 A1* | 8/2012 | Setton | H04N 7/147 348/14.03 |
| 2012/0216151 A1* | 8/2012 | Sarkar | G06F 3/04883 715/863 |
| 2012/0287218 A1 | 11/2012 | Ok | |
| 2013/0138424 A1* | 5/2013 | Koenig | G06F 17/271 704/9 |
| 2014/0022184 A1 | 1/2014 | Bathiche et al. | |
| 2014/0111420 A1 | 4/2014 | Ahn et al. | |
| 2014/0218467 A1* | 8/2014 | You | H04N 7/142 348/14.16 |

FOREIGN PATENT DOCUMENTS

| KR | 1020140050484 A | 4/2014 |
|---|---|---|
| KR | 1020140051651 A | 5/2014 |

OTHER PUBLICATIONS

Communication dated Jun. 29, 2015, issued by the International Searching Authority in International Application No. PCT/KR2015/003437 (PCT/Isa/237) Yes.

* cited by examiner

DISPLAY APPARATUS AND METHOD FOR PERFORMING VIDEOTELEPHONY USING THE SAME

CROSS-REFERENCE TO RELATED APPLICATION(S)

This application claims priority from Korean Patent Application No. 10-2014-0055717, filed on May 9, 2014, in the Korean Intellectual Property Office, the disclosure of which is incorporated herein by reference in its entirety.

BACKGROUND

Field

Apparatuses and methods consistent with exemplary embodiments relate to a display apparatus and a method for performing a videotelephony using the same, and more particularly, to a method for performing a videotelephony with another party of the videotelephony.

Description of Related Art

Recently, due to the development of electronic technology, various types of electronic products have been developed and come into wide use. For example, a variety of display apparatuses such as TVs, cell phones, PCs, notebooks, PDAs, and the like, are being used in most general houses.

As a result of the increase in the amount of display apparatuses that are being increasingly used, needs of a user for more diverse functions have been also increased. For example, the efforts of the respective manufacturers for satisfying the needs of the user have also been increased. For example, products in which a function such as a videotelephony, or the like, is mounted have been increasingly suggested.

Meanwhile, according to the videotelephony manner, the user may view an image of another party in the same manner as a face-to-face communication, but may sensitively feel a sense of difference unlike the face-to-face communication due to an environmental restriction that the user should communicate while viewing a screen thereof.

Accordingly, there is a need for a method capable of transferring a richer sensitivity even at the time of the videotelephony.

SUMMARY

Exemplary embodiments overcome the above disadvantages and other disadvantages not described above. Also, an exemplary embodiment is not required to overcome the disadvantages described above, and an exemplary embodiment may not overcome any of the problems described above.

One or more exemplary embodiments provide a display apparatus that is capable of outputting a specific feedback according to gestures and spoken voices of users in order to richly provide an emotional communication experience even at a time of a videotelephony. Also provided is a method for performing a videotelephony using the same.

According to an aspect of an exemplary embodiment, provided is a display apparatus including a videotelephony performer configured to perform a videotelephony with another display apparatus; and a controller configured to control a corresponding feedback that is output when gestures and speech of a user and another party of the videotelephony have a preset correlation during a process in which the videotelephony is performed.

The preset correlation may refer to a gesture that has a meaning represented by the spoken voice.

The controller may output the corresponding feedback when the gestures and the spoken voices of the user and the other party of the videotelephony have the preset correlation and the gesture and the spoken voice of the user have the same meaning as the gesture and the spoken voice of the other party of the videotelephony.

The videotelephony performer may include a camera configured to photograph the user; a microphone configured to obtain a voice that is spoken by the user; a communicating unit configured to perform communications with a server to receive an image that is obtained by photographing the other party of the videotelephony and a voice spoken by the other party of the videotelephony; a display configured to display an image that is obtained by photographing the user and the image that is obtained by photographing the other party of the videotelephony; and a speaker configured to output the spoken voice of the other party of the videotelephony.

The server may determine whether or not the gestures and the speech of the user and the other party of the videotelephony have a preset correlation, and transmit a control instruction for outputting the corresponding feedback to the display apparatus in response to the gestures and the speech of the user and the other party of the videotelephony having the preset correlation.

The controller may output the corresponding feedback based on the received control instruction.

The controller may determine whether or not the gesture and the speech of the user and the gesture and the speech of the other party of the videotelephony received from the server have the preset correlation, and output the corresponding feedback in response to the gesture and the speech of the user and the gesture and the speech of the other party of the videotelephony received from the server having the preset correlation.

The feedback may include at least one of a visual effect and a sound effect that correspond to the gestures and the speech of the user and the other party of the videotelephony.

The controller may output a feedback corresponding to a position at which a gaze of the user settles, in response to the gesture and the speech of the user having the preset correlation.

The controller may expand and output an image displayed at the position at which the gaze of the user settles.

According to an aspect of another exemplary embodiment, provided is a method for performing a videotelephony using a display apparatus, the method including performing the videotelephony with another display apparatus; and outputting a corresponding feedback in response to gestures and speech of a user and the other party of the videotelephony having a preset correlation during a process in which the videotelephony is performed.

The preset correlation may refer to a gesture having the meaning represented by the spoken voice.

The outputting of the corresponding feedback may include, in response to the gestures and the speech of the user and the other party of the videotelephony having the preset correlation and the gesture and the speech of the user having the same meaning as the gesture and the spoken voice of the other party of the videotelephony, outputting the corresponding feedback.

The display apparatus that performs the method may include a camera configured to photograph the user; a microphone configured to obtain a voice spoken by the user; a communicating unit configured to perform communications with a server to receive an image obtained by photographing the other party of the videotelephony and speech by the other party of the videotelephony; a display configured to display an image obtained by photographing the user and the image obtained by photographing the other party of the videotelephony; and a speaker configured to output the speech of the other party of the videotelephony.

The server may determine whether or not the gestures and the speech of the user and the other party of the videotelephony have a preset correlation, and transmit a control instruction for outputting the corresponding feedback to the display apparatus in response to the gestures and the speech of the user and the other party of the videotelephony having the preset correlation.

The outputting of the corresponding feedback may include outputting the feedback based on the received control instruction.

During the outputting of the corresponding feedback, it may be determined whether or not the gesture and the speech of the user and the gesture and the speech of the other party of the videotelephony received from the server have the preset correlation, and as a result of the determination, in response to the gesture and the speech of the user and the gesture and the speech of the other party of the videotelephony received from the server having the preset correlation, the corresponding feedback may be output.

The feedback may include at least one of a visual effect and a sound effect that correspond to the gestures and the speech of the user and the other party of the videotelephony.

In the outputting of the corresponding feedback, in response to the gesture and the speech of the user having the preset correlation, a feedback corresponding to a position at which a gaze of the user settles may be output.

The outputting of the corresponding feedback may include outputting an image displayed at the position at which the gaze of the user settles and which may be expanded.

BRIEF DESCRIPTION OF THE DRAWINGS

The above and/or other aspects will be more apparent by describing certain exemplary embodiments with reference to the accompanying drawings, in which.

DETAILED DESCRIPTION

Figure 1:
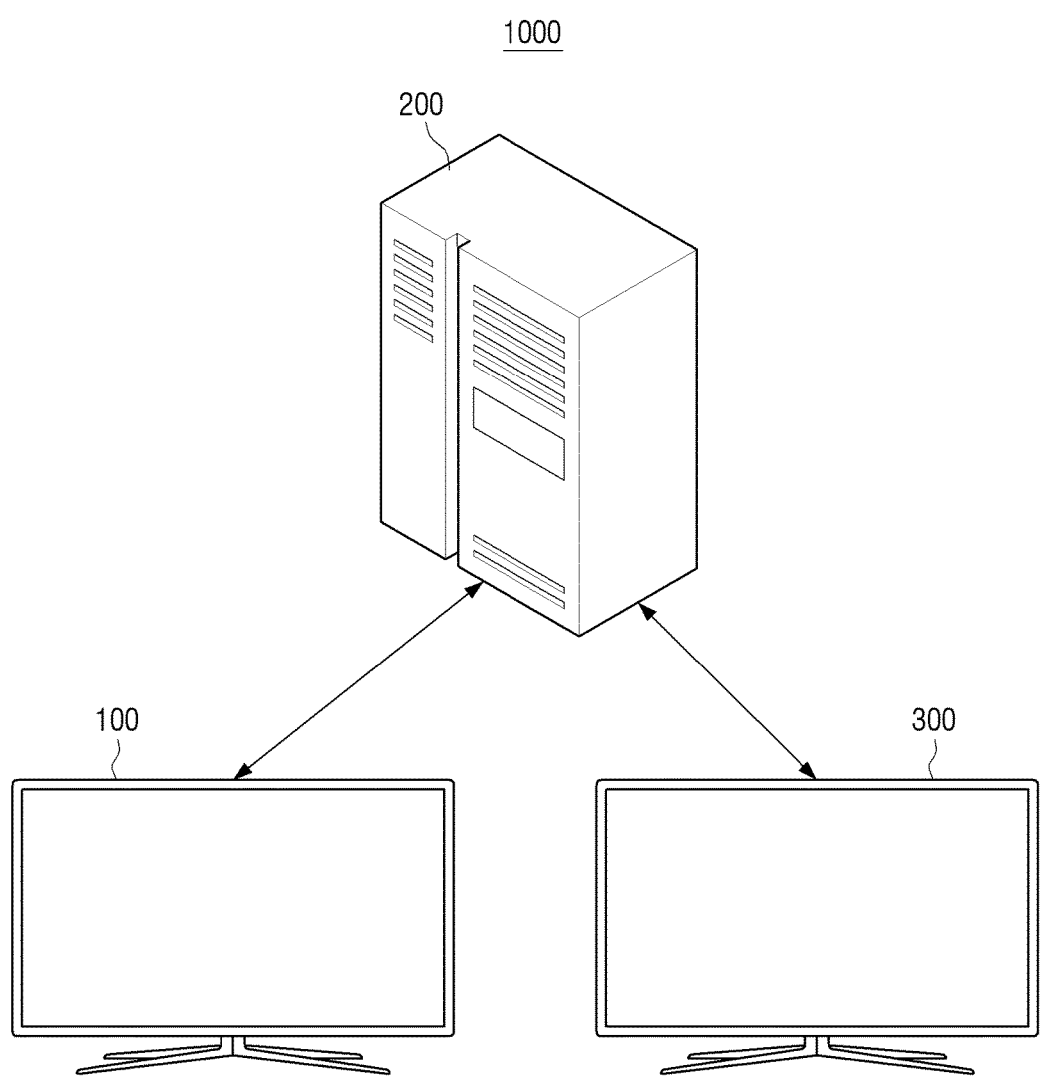
FIG. 1 is a diagram illustrating a videotelephony system according to an exemplary embodiment.

Hereinafter, the exemplary embodiments are described in more detail with reference to the accompanying drawings. Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

FIG. 1 is a diagram illustrating a videotelephony system according to an exemplary embodiment. Referring to FIG. 1, the videotelephony system 1000 includes a display apparatus 100, a server 200, and another display apparatus 300.

Referring to FIG. 1, the display apparatus 100 and the other display apparatus 300 may be implemented as TVs, but this is merely for purposes of example. As another example, the display apparatus 100 and the other display apparatus 300 may be implemented as various forms of apparatuses such as smartphones, tablets, and the like.

The display apparatus 100 may be connected to the server 200 via a network such as the Internet, or the like, to perform a videotelephony with the other display apparatus 300 that is connected to the server 200.

For example, if the videotelephony is performed, the display apparatus 100 may photograph a user performing the videotelephony and obtain a voice that is spoken by the user to transmit videotelephony data to the other display apparatus 300 through the server 200.

In addition, the display apparatus 100 may receive the videotelephony data that is transmitted by the other display apparatus 300 from the server 200, and may output an image that is obtained by photographing the other party of the videotelephony (i.e., a user of the other display apparatus 300) by the other display apparatus 300 and a voice recognized as being spoken by the other party of the videotelephony which is obtained by the other display apparatus 300, based on the received videotelephony data.

Meanwhile, the other display apparatus 300 may also perform the same function as that of the display apparatus 100 in order to perform the videotelephony.

For example, the server 200 may transmit and receive the videotelephony data between the display apparatus 100 and the other display apparatus 300 by giving a telephone number, and the like, to the display apparatus 100 and the other display apparatus 300.

Although FIG. 1 illustrates an example in which the display apparatus 100 performs the videotelephony with the other one display apparatus 300, this is merely one example. As another example, a plurality of display apparatuses may perform the videotelephony with the display apparatus 100.

According to one or more exemplary embodiments, in a case in which gestures taken and voices spoken by the users performing the videotelephony have a specific correlation, the display apparatus 100 and the other display apparatus 300 may output a feedback corresponding to the specific correlation.

For example, a method of outputting the feedback corresponding to the specific correlation when the gestures and the spoken voices have the specific correlation are described in detail with reference to the accompanying drawings.

Figure 2:
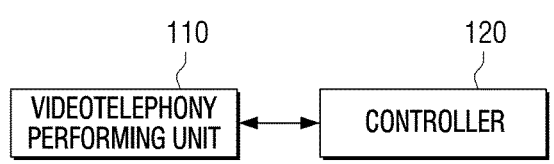
FIG. 2 is a block diagram illustrating a configuration of a display apparatus according to an exemplary embodiment.
Figure 2:
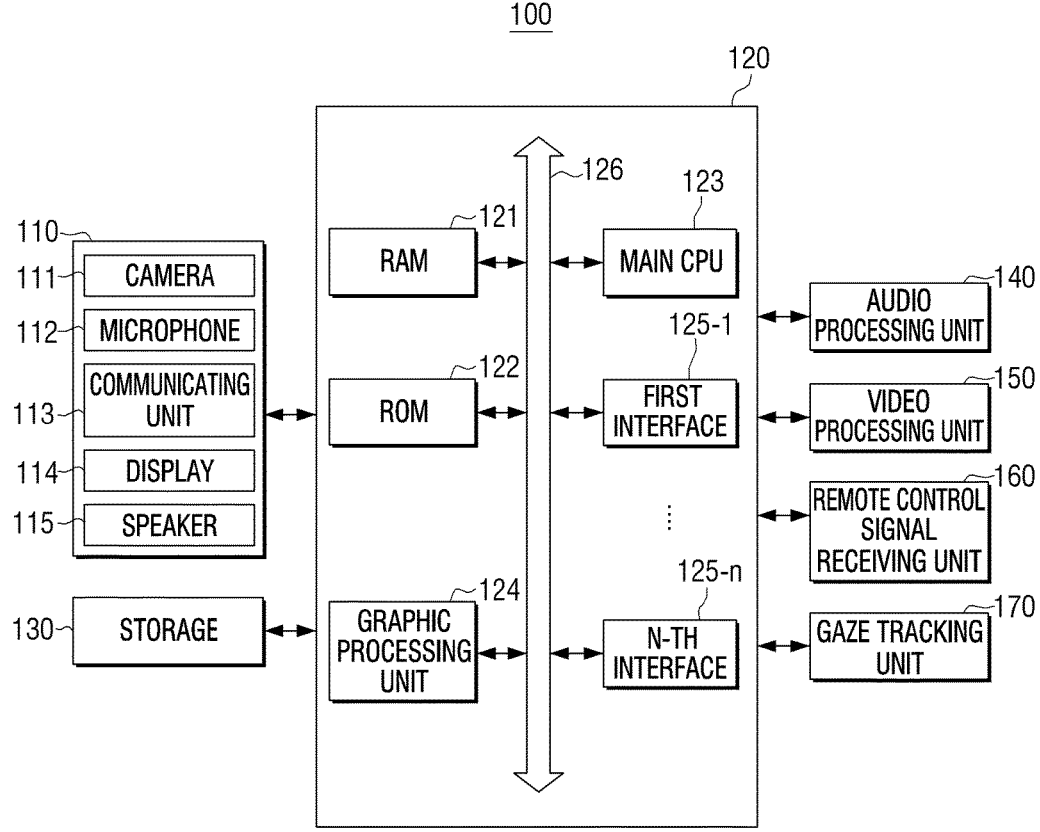

FIG. 2 is a block diagram illustrating a configuration of the display apparatus according to an exemplary embodiment. For example, FIG. 2A is a block diagram schematically illustrating the configuration of the display apparatus according to an exemplary embodiment and FIG. 2B is a block diagram illustrating a detailed configuration of the display apparatus according to an exemplary embodiment.

Referring to FIG. 2A, the display apparatus 100 includes a videotelephony performing unit 110 and a controller 120.

The videotelephony performing unit 110 may perform the videotelephony with the other display apparatus 300.

For example, the videotelephony performing unit 110 may photograph the user performing the videotelephony, obtain the voice which is spoken by the user, and perform communications with the server 200, such that the other display apparatus 300 may receive the image obtained by photographing the other party of the videotelephony and the obtained voice spoken by the other party of the videotelephony. In addition, the videotelephony performing unit or performer 110 may display the image that is obtained by photographing the user and the image obtained by photographing the other party of the videotelephony and may output the voice or speech that is spoken by the other party of the videotelephony.

The controller 120 may control a general operation of the display apparatus 100. For example, if the videotelephony is performed according to an instruction of the user, the controller 120 may control the videotelephony performing unit 110 to photograph the user performing the videotelephony and obtain a voice or speech that is spoken by the user.

In addition, the controller 120 may transmit the videotelephony data including the photographed image and the obtained voice to the other display apparatus 300, through the server 200.

For example, if the videotelephony data generated by the other display apparatus 300 is received from the server 200, the controller 120 may output the image obtained by photographing the other party of the videotelephony and the obtained voice spoken by the other party of the videotelephony from the other display apparatus 300.

As such, the controller 120 may perform control so that the user performs the videotelephony with the user of the other display apparatus 300, that is, the other party of the videotelephony.

For example, if the gestures and the spoken voices of the user performing the videotelephony and the other party of the videotelephony have a preset correlation during a process in which the videotelephony is performed, the controller 120 may perform control so that a feedback corresponding to the preset correlation is output.

In this example, the preset correlation may be a case in which the gesture corresponds to a gesture that has the meaning represented by the spoken voice.

For example, the user may assert a gesture by putting up his or her hand while speaking the term "high-five".

In this example, because the term "high-five" refers to an action in which two people simultaneously put up their hand and contact respective palms of the other party, it may be regarded that the gesture of putting up the hand corresponds to the gesture including a meaning represented by the spoken voice "high-five", and the spoken voice "high-five" and the gesture putting up the hand may have the same correlation.

As another example, the user may make a gesture of rolling the hand and putting the rolled hand to a mouth while singing a song.

In this example, because the gesture of rolling the hand and putting the rolled hand to a mouth of the user corresponds to a gesture that generally sings a song, it may be regarded that the gesture of rolling the hand and putting the rolled hand to the mouth corresponds to a gesture having a meaning represented by a spoken voice singing the song, and the spoken voice singing the song and the gesture rolling the hand and putting the rolled hand to the mouth have the correlation.

Meanwhile, the vocal "high-five" and the gesture having the correlation therewith, and the voice singing the song and the gesture having the correlation therewith have been described in the above-mentioned examples, but are merely for purposes of example. As another example, the voice and the gesture having the correlation therewith may have various forms.

For example, because the term "hello" may be used to refer to a greeting of a user waving his or her hand on meeting or parting, it may be determined that the gesture putting up the hand and horizontally waving the hand corresponds to a gesture represented by the spoken voice "hello" and the spoken voice "hello" and the gesture waving the hand may have the correlation.

As such, in the case in which the gesture has a meaning that is represented by the spoken voice, it may be regarded that the corresponding gesture and spoken voice have a correlation.

For example, the feedback may be at least one of a visual effect and a sound effect that correspond to the gesture and the spoken voice.

For example, it may be assumed that the user speaks a vocal command of "high-five" and takes the gesture waving his or her hand. In this example, the controller 120 may output a graphic user interface (GUI) that has an animation emoticon form in which the palms of the users are high-fived with each other as the visual effect and may output a "clap" sound when the palms are high-fived, as the sound effect.

As another example, the user may perform the gesture of rolling the hand and putting the rolled hand to their mouth while singing the song. In this example, the controller 120 may output a graphic user interface (GUI) of a microphone form at the hand of the user as the visual effect and may output an accompaniment that fits the song as the sound effect.

Meanwhile, the controller 120 may determine whether or not the gesture and the spoken voice of the user, and the gesture and the spoken voice of the other party of the videotelephony received from the server 200 have a preset correlation, and if a result of the determination is that there is the preset correlation, the controller 120 may output the feedback corresponding to the preset correlation.

For example, the display apparatus 100 may store information about the gesture having the correlation with the spoken voice. For example, the display apparatus 100 may map and store information about the gesture having a meaning that is represented by the corresponding spoken voice, to each spoken voice.

For example, the display apparatus 100 may store information indicating that the gesture having a meaning represented by the speech "high-five" corresponds to the gesture of putting up the hand and may store information about the gesture having the meaning represented by the voice singing the song corresponding to the gesture of rolling the hand and putting the rolled hand toward the mouth.

Therefore, the controller 120 may determine whether the gestures and the spoken voices of the users of the display apparatus 100 and the other display apparatus 300, respectively, have the preset correlation using prestored information.

For example, the controller 120 may analyze the image photographed by the display apparatus 100 and the image photographed by the other display apparatus 300, respectively, in order to recognize specific objects (such as a face, a hand, and the like), and may determine gestures taken by the user and the other party of the videotelephony according to a form, a position, a motion, and the like, of the recognized objects.

For example, the controller 120 may recognize the hands of the users from the respective images and determine the form, position, motion, and the like of the hand using a grayscale difference between adjacent pixels in order to determine whether the user is making the gesture of putting up the hand, making the gesture of rolling the hand and putting the rolled hand to the mouth, and the like.

In addition, the controller 120 may perform a voice recognition for each of the voices that are obtained by the display apparatus 100 and the voice obtained by the other display apparatus 300.

For example, the controller 120 may perform the voice recognition for the voices that are obtained by the display apparatus 100 and the other display apparatus 300, respectively, to determine whether the spoken voices of the user and the other party of the videotelephony include a specific keyword or a sentence, or whether the spoken voices correspond to a song having a constant pitch, and the like.

For example, in a case in which the voices that are obtained by the display apparatus 100 and the other display apparatus 300, respectively, are "high-five" or "let's high-five", since the corresponding voice includes a keyword "high-five", the controller 120 may determine that the respective users speak the voice "high-five". For example, in a case in which the voices that are obtained by the display apparatus 100 and the other display apparatus 300, respectively, have the constant pitch, the controller 120 may determine that the respective users sing the song.

Therefore, the controller 120 may determine whether the gestures taken by the user and the other party of the videotelephony have the preset correlation with the spoken voice using the prestored information.

For example, it may be determined that the voices obtained by the display apparatus 100 and the other display apparatus 300, respectively, correspond to the "high-five" and the user and the other party of the videotelephony take the gestures putting up the hand based on the images photographed by the display apparatus 100 and the other display apparatus 300, respectively. For example, the controller 120 may determine that the gesture taken by the user of the display apparatus 100 has the preset correlation with the spoken voice and the gesture taken by the user of the other display apparatus 300 has the preset correlation with the spoken voice.

As another example, it may be determined that the voice obtained by the other display apparatus 300 corresponds to a specific song and the other party of the videotelephony takes the gestures of rolling the hand and putting the rolled hand to the mouth based on the image photographed by the other display apparatus 300. In this example, the controller 120 may determine whether the gesture taken by the user of the other display apparatus 300 has the preset correlation with the spoken voice.

For example, when the gestures and the spoken voices of the user and the other party of the videotelephony have the preset correlation, and the gesture and the spoken voice of the user have the same meaning as that of the other party of the videotelephony, the controller 120 may output the corresponding feedback.

For example, the phrase "have the same meaning" may refer to a case in which the user and the other party of the videotelephony take the same gesture as each other, and the spoken voices of the user and the other party of the videotelephony are the same or include the same keyword or sentence as each other.

For example, in a case in which the user and the other party of the videotelephony make the gesture of putting up the hand and speak "high-five" or "let's high-five", it may be regarded that the gestures and the spoken voices of the user and the other party of the videotelephony have a preset correlation and have the same meaning as each other.

For example, when the gestures and the spoken voices of the respective users have the correlation, and the gestures and the spoken voices of the respective users have the same meaning as each other, the controller 120 may output the corresponding feedback.

For example, the display apparatus 100 may store information about the feedback corresponding to the gestures and the spoken voices having the correlation.

In this example, the display apparatus 100 may map and store the information about the feedback corresponding to the gesture and the spoken voice, to each of the gestures and the spoken voices having the correlation.

In some examples, the display apparatus 100 may map and store the animation emoticon in which the palms are high-fived and the sound when the palms are high-fived, to the voice "high-five" and the gesture putting up the hand. Accordingly, the display apparatus 100 may map and store an emoticon of a microphone form and the accompaniment of the corresponding song to the voice singing the song and the gesture rolling the hand and putting the rolled hand toward the mouth.

Therefore, the controller 120 may output the feedback corresponding to the gesture and the spoken voice having the correlation, using the prestored information.

For example, the voice spoken and the gesture taken by the user of the display apparatus 100 may be the vocalization of "high-five" and the gesture of putting up the hand, and the voice spoken and the gesture taken by the user of the other display apparatus 300 are also the voice "high-five" and the gesture putting up the hand.

In this example, the controller 120 may output a feedback that is mapped to the voice "high-five" and the gesture of putting up the hand. In this example, the controller 120 may output the GUI of the animation emoticon form in which the palms are high-flying each other as the visual effect and may output a "clap" sound when the palms are high-fived, as the sound effect.

Meanwhile, the controller 120 may output a videotelephony image including a PIP (Picture In Picture) screen. That is, the controller 120 may display the image that is obtained by photographing the other party of the videotelephony on a main screen (a screen having a relatively large size) and may display the image that is obtained by photographing the user on a sub-screen (which in this example is a screen having a relatively small size).

For example, the controller 120 may overlay and display the GUI (Graphical User Interface) output as the visual effect on the image that is obtained by photographing the other party of the videotelephony.

Meanwhile, the above-mentioned example describes a case in which the corresponding feedback is output when the gestures and the spoken voices of the user and the other party of the videotelephony have the same meaning as each other, but this is merely for purposes of example.

For example, even in a case in which the gestures and the spoken voices of the user and the other party of the videotelephony do not have the same meaning as each other, the controller 120 may also output the corresponding feedback as long as the gesture and the spoken voice of the other party of the videotelephony have the preset correlation.

For example, the user of the other display apparatus 300 may take the gesture of rolling the hand and putting the rolled hand to the mouth while singing the song.

In this example, the controller 120 may output the feedback that is mapped to the voice singing the song and the gesture of rolling the hand and putting the rolled hand to the mouth, regardless of the gesture and the spoken voice of the user of the display apparatus 100. For example, the controller 120 may output the GUI in the microphone form to the hand of the other party of the videotelephony that is displayed on the screen as the visual effect and may output the accompaniment that fits the corresponding song as the sound effect.

In addition, the above-mentioned example describes a case in which the corresponding feedback is output while the gestures and the spoken voices of the users have the preset correlation, but this is merely for purposes of example.

For example, even in a case in which the gestures and the spoken voices of the users do not have the preset correlation, the controller 120 may also output the corresponding feedback while the users take specific gestures and speak specific voices.

For example, it may be assumed that the user of the other display apparatus 300 only sings the song without taking the gesture of rolling the hand and putting the rolled hand to the mouth.

In this example, even in a case in which the user of the other display apparatus 300 does not take the gesture of rolling the hand and putting the rolled hand to the mouth, the controller 120 may output the accompaniment that fits the song as the sound effect.

Also, even in a case in which the gesture and the spoken voice of the user have the preset correlation, the controller 120 may also output a feedback corresponding to a position at which the user's gaze settles.

For example, the controller 120 may output the feedback corresponding to a position at which the user's gaze settles on in the videotelephony image, in a state in which the videotelephony image is displayed.

For example, it may be assumed that the user speaks "look at the birdie" and takes a gesture pointing out a specific point on the screen.

In this example, because the phrase "look at the birdie" is a voice inducing or requesting the user's gaze to view a specific point, it may be regarded that the gesture of pointing out the specific point corresponds to a gesture that has a meaning represented by the spoken voice "look at the birdie", and the spoken voice "look at the birdie" and the gesture pointing out the specific point of the correlation.

Therefore, the controller 120 may determine the form, the position, and the like of the hand of the user from the image that is obtained by photographing the user of the display apparatus 100. For example, when the hand of the user points out a specific point on the screen, the controller 120 may determine that the corresponding gesture has the correlation with the voice "look at the birdie".

In this example, the display apparatus 100 may store information about the gesture having the meaning that is represented by the voice "look at the birdie" corresponding to the gesture pointing out the specific point.

For example, the controller 120 may output a GUI of a specific form to the position at which the user's gaze settles on the screen, as the visual effect. As a non-limiting example, the GUI may be a line, a highlight, a figure, and the like. For example, the display apparatus 100 may map and store the GUI of the specific form to the voice "look at the birdie" and the gesture pointing out the specific point.

In this example, the controller 120 may divide the screen into two regions upon performing the videotelephony, so as to display the image that is obtained by photographing the other party of the videotelephony on one region and display a contents screen on the other region.

For example, the contents, which are data which may be used by the users upon performing the videotelephony, may have a type of text, image, moving image, and the like.

For example, in the case in which the screen is divided into the two regions, the controller 120 may transmit the image that is obtained by photographing the user of the display apparatus 100 and the contents screen to the server 200. In this example, the server 200 may transmit the image and contents screen together that are transmitted by the display apparatus 100 to the other display apparatus 300 of the other party of the videotelephony performing the videotelephony with the display apparatus 100.

In this example, the users performing the videotelephony may simultaneously receive the image that is obtained by photographing the other party of the videotelephony and the contents screen.

In this example, when the user settles the gaze at a specific point of the region on which the contents screen is displayed among the two divided regions and says the words "look at the birdie", the controller 120 may display the GUI of the specific form on the region at which the user's gaze settles.

For example, the controller 120 may transmit position information about the point at which the user's gaze settles on the contents screen, that is, the point at which the GUI of the specific form is displayed, to the server 200. Accordingly, the server 200 may transmit the corresponding position information to the other display apparatus 300.

In this example, the other display apparatus 300 may display the GUI of the specific form at the same point as the point in time at which the user's gaze of the display apparatus 100 settles on the contents screen using the position information that is received from the server 200.

As another example, if the position information that is transmitted from the other display apparatus 300 is received from the server 200, the controller 120 may also display the GUI of the specific form at the corresponding position on the contents screen.

According to one or more exemplary embodiments, the above-described examples describes the case in which the feedback corresponding to the position at which the user's gaze settles is output, but this is merely for purpose of an example.

For example, the controller 120 may also change a layout of the screen on which the videotelephony image is displayed, according to the user's gaze.

In this example, the controller 120 may expand and output an image displayed at the position at which the user's gaze settles.

For example, if the user settles their gaze at one of the two divided regions and outputs their voice, the controller 120 may expand a size of the region at which the user's gaze settles and reduce a size of a region in which the user's gaze does not settle.

For example, if the user outputs their voice while viewing the region on which the other party of the videotelephony is displayed, the controller 120 may expand a size of the region on which the other party of the videotelephony is displayed and reduce a size of the region on which the contents screen is displayed. For example, if the user speaks while viewing the region on which the contents screen is displayed, the controller 120 may reduce the size of the region on which the other party of the videotelephony is displayed and expand the size of the region on which the contents screen is displayed.

For example, the controller 120 may transmit information about the region at which the user's gaze settles, that is, information about whether the user views a videotelephony screen or views the contents screen, to the server 200. In response, the server 200 may transmit the corresponding position information to the other display apparatus 300.

For example, the other display apparatus 300 may expand a size of the region at which the user's gaze of the display apparatus 100 settles and reduce the size of the other region, using the position information that is received from the server 200.

For example, if the position information transmitted from the other display apparatus 300 is received from the server 200, the controller 120 may expand the size of the region in which the user's gaze of the other display apparatus 300 settles and reduce the size of the other region, using the received position information.

Accordingly, the controller 120 may change the layout of the videotelephony screen according to the region at which the user's gaze settles.

Meanwhile, hereinafter, an example configuration of the display apparatus shown in FIG. 2B is described based on the contents described above.

Referring to FIG. 2B, the display apparatus 100 includes a videotelephony performing unit 110, a controller 120, a storage 130, an audio processing unit 140, a video processing unit 150, a remote control signal receiving unit 160, and a gaze tracking unit 170.

For example, the videotelephony performing unit 110, which is a configuration for performing the videotelephony with the other display apparatus 300, may include a camera 111, a microphone 112, a communicating unit 113, a display 114, and a speaker 115.

For example, the camera 111 may photograph the user performing the videotelephony. For example, the camera 111 may be positioned on a front surface of the display apparatus 100 to photograph the user while the user is performing the videotelephony, thereby making it possible to generate an image for the videotelephony.

In this example, the camera 111 may be embedded in a display apparatus 100 or may be connected to the display apparatus 100 in an external type. As another example, the camera 111 may be implemented such that it is exposed to the outside when the videotelephony is performed, while being ordinarily hidden in the display apparatus 100.

Also, the microphone 112 obtains or otherwise receives the voice spoken by the user performing the videotelephony.

The communicating unit 113 may perform communications with the server 200 to transmit and receive videotelephony data. For example, the communicating unit 113 may transmit the image photographed by the camera 111 and a vocal command that is obtained by the microphone 112 to the server 200, and may receive the image of the other party of the videotelephony photographed by the other display apparatus 300 and the voice spoken by the other party of the videotelephony from the server 200.

For example, the communicating unit 113 may perform communications with the server 200 according to various communications schemes and may include a chip corresponding to each communications scheme. For example, the communicating unit 130 may be connected to a server 200 via the Internet using a wire-wireless LAN card, and the like.

The display 114 may display various images for the videotelephony. For example, the display 114 may display the image that is obtained by photographing the user and the image that is obtained by photographing the other party of the videotelephony. In this example, the image that is obtained by photographing the user and the image that is obtained by photographing the other party of the videotelephony may be displayed in the form of PIP, and the visual effect may be overlaid on the image that is obtained by photographing the other party of the videotelephony to be displayed.

In this example, the display 114 may also display the image that is obtained by photographing the other party of the videotelephony and the contents screen. In this example, the display 114 may divide the screen into two regions, for example, so as to display the image that is obtained by photographing the other party of the videotelephony on one region and display the contents screen on the other region.

The speaker 115 may output various audio signals for the videotelephony. For example, the speaker 115 may output the spoken voice of the other party of the videotelephony and the sound effect.

The storage 130 may store various information. For example, the storage 130 may store information about a gesture having the correlation with the spoken voice, information about a feedback corresponding to the gesture and the spoken voice or words that have the correlation, and the like.

In this example, the controller 120 may determine whether or not the gestures and the spoken voices of the user and the other party of the videotelephony have the preset correlation using the above-mentioned information. In this example, if the correlation is present, the controller 120 may perform a control so that the feedback corresponding to the correlation is output.

Meanwhile, information about the feedback stored in the storage 130 may be set and changed by the user. For example, the controller 120 may obtain and store the voice that is spoken by the user through the microphone 112, and may apply the stored voice as the sound effect for the specific gesture and the spoken voice having the correlation based on the user instruction.

For example, the controller 120 may display a list for the sound that is obtained and stored through the microphone 112, and may set a sound selected from the list as the sound effect for a specific gesture and a spoken voice having the correlation.

Also, the audio processing unit 140 may perform a processing of audio. For example, the controller 120 may control the audio processing unit 140 to encode the voice or the speech which is obtained through the microphone 112 upon performing the videotelephony into a specific form for transmitting the obtained voice to the server 200. Also, the controller 120 may perform processes such as decoding, amplifying, noise filtering, and the like, on the speech that is obtained by the other display apparatus 300 received from the server 200, which is allowed to have a form to be output from the speaker 115.

Also, the audio processing unit 140 may perform processing for various audio data.

The video processing unit 150 may perform a processing of video data. For example, the controller 120 may control the video processing unit 150 to encode the image that is photographed by the camera 111 upon performing the videotelephony into a specific form for transmitting the image to the server 200, and may perform processes such as decoding, noise filtering, and the like on the image that is photographed by the other display apparatus 300 received from the server 200, which is allowed to have a form to be output from the display 114.

In these examples, the video processing unit 150 may perform a processing for various video data.

For example, the controller 120 may control the communicating unit 130 to transmit the encoded image and voice to the server 200.

In this example, the remote control signal receiving unit 160 may receive a user instruction for controlling the display apparatus 100 from a remote controller (not shown). In this example, the user instruction may include an instruction for performing the videotelephony.

In this example, if the controller 120 receives a remote control signal corresponding to the instruction for performing the videotelephony, the controller 120 may perform a control so that the videotelephony is performed.

For example, the controller 120 may receive the remote control signal corresponding to the instruction for performing the videotelephony, the controller 120 may activate the camera 111 to photograph the user performing the videotelephony, may activate the microphone 112 to obtain the speech that is spoken by the user performing the videotelephony and transmit the videotelephony data to the server 200. Also, the controller 120 may output the image that is photographed by the other display apparatus 300 and the obtained voice that is received from the server 200.

The gaze tracking unit 170 may track the gaze of a user. For example, the gaze tracking unit 170 may detect a location and a gaze of the eyes from the image that is obtained by photographing the user and may detect a direction in which the gaze of the user settles, from the detected eyes.

For example, the gaze tracking unit 170 may determine the direction in which the gaze of the user settles or comes to rest, based on a position of a region in which a pupil is positioned in the eyes of the user. For example, if the pupil is located in the right, left, top, and bottom directions based on a center of the eyes of the user, the gaze tracking unit 170 may determine that a gaze of the user is looking at the right, left, top, and bottom directions of the screen displayed on the display 114, respectively.

It should be appreciated that the above-mentioned method describes an exemplary embodiment only, and the direction in which a gaze of the user settles may be detected by various methods.

In this example, the controller 120 may change the layout of the videotelephony screen based on a direction in which the gaze of the user detected by the gaze tracking unit 170 settles.

Also, the controller 120 may include a random access memory (RAM) 121, a read only memory (ROM) 122, a main central processing unit (CPU) 123, a graphic processing unit 124, first to n-th interfaces 125-1 to 125-n, and a bus 126.

In this example, the RAM 121, the ROM 122, the main CPU 123, the graphic processing unit 124, the first to n-th interfaces 125-1 to 125-n, and the like, may be connected to each other through the bus 126. The first to n-th interfaces 125-1 to 125-n may be connected to the variety of components described above. For example, one of the interfaces may be a network interface that is connected to an external device through a network.

The main CPU 123 may access the storage 130 and perform booting using an operating system (O/S) that is stored in the storage 130. In addition, the main CPU 123 performs various operations using a variety of application programs, data, and the like stored in the storage 130.

The ROM 122 stores a set of instructions for booting a system. For example, when a turn-on instruction is input to supply power, the main CPU 123 may copy the O/S stored in the storage 130 in the RAM 121 according to the instructions that are stored in the ROM 122 and executes the O/S so as to boot the system. When the booting is completed, the main CPU 123 may copy a variety of application programs stored in the storage 130 in the RAM 121 and may execute the application programs copied in the RAM 121 so as to perform a variety of operations.

The graphic processing unit 124 may generate a screen that includes various objects, for example, an icon, an image, a text, and the like, and may output the screen through the display 114.

Meanwhile, the above-mentioned examples describe a case in which the server 200 may transmit and receive the videotelephony data between the display apparatus 100 and the other display apparatus 300, and the display apparatus 100 may determine whether or not the gestures and the spoken voices of the user and the other party of the videotelephony have the preset correlation and may output the corresponding feedback according to the determination result.

However, it should be appreciated that this is merely an example, and the control instruction allowing the server 200 to output the feedback may be transmitted to the display apparatus 100. For example, an exemplary embodiment in which the feedback output from the display apparatus 100 is controlled by the server 200 will be described with reference to FIG. 3.

Figure 3:
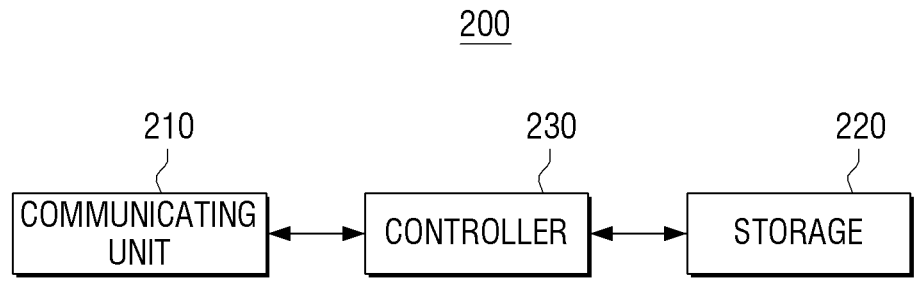
FIG. 3 is a block diagram illustrating a configuration of a server according to an exemplary embodiment.

FIG. 3 is a block diagram illustrating a configuration of a server according to an exemplary embodiment. Referring to FIG. 3, the server 200 includes a communicating unit 210, a storage 220, and a controller 230.

The communicating unit 210 may perform communications with the display apparatus 100 and the other display apparatus 300.

For example, the communicating unit 210 may receive the videotelephony data that is transmitted from the display apparatus 100 to transmit the videotelephony data to the other display apparatus 300, and may receive the videotelephony data that is transmitted from the other display apparatus 300 to transmit the videotelephony data to the display apparatus 100.

Accordingly, the communicating unit 210 may perform communications with the display apparatus 100 and the other display apparatus 300 according to various communications schemes and may include a chip that corresponds to each communications scheme. For example, the communicating unit 210 may be connected to the display apparatus 100 and the other display apparatus 300 via the Internet using a wire-wireless LAN card, and the like.

The storage 220 may store various information. For example, the storage 220 may store information about the gesture having the correlation with the spoken voice, information about a feedback corresponding to the gesture and the spoken voice that have the correlation, and the like. For example, the controller 230 may determine whether or not the gestures and the spoken voices of the user and the other party of the videotelephony have a preset correlation using the above-mentioned information. For example, if the correlation is present, the controller 230 may perform a control so that the feedback corresponding to the correlation is output.

The controller 230 may control a general operation of the server 200. For example, the controller 230 may control the communicating unit 210 to receive the videotelephony data from the display apparatus 100 and the other display apparatus 300, respectively. For example, the controller 230 may receive the images that are obtained by photographing the respective users of the display apparatus 100 and the other display apparatus 300, and the voices that are spoken by the users.

In addition, the controller 230 may determine whether or not the gestures and the spoken voices of the user and the other party of the videotelephony received from the display apparatus 100 and the other display apparatus 300, respectively, have the preset correlation. Based on a result of the determination, there is the preset correlation, the controller 230 may transmit the control instruction for outputting the corresponding feedback to the display apparatus 100.

For example, the storage 220 may store information about the gesture having the correlation with the spoken voice.

For example, the storage 220 may map and store information about the gesture having the meaning that is represented by the corresponding spoken voice to each spoken voice.

For example, the storage 220 may store information that the gesture having the meaning represented by the voice "high-five" which corresponds to the gesture of putting up the hand and may store information in which the gesture having the meaning represented by the voice singing the song corresponds to the gesture rolling the hand and putting the rolled hand to the mouth.

Therefore, the controller 230 may determine whether the gestures and the spoken voices of the users and the other party of the videotelephony received from the display apparatus 100 and the other display apparatus 300, respectively, have a preset correlation, using prestored information.

For example, the controller 230 may recognize specific objects (such as a face, a hand, etc.) from the images that are received from the display apparatus 100 and the other display apparatus 300, respectively, and may determine the gesture of the user according to a form, a position, a motion, and the like, of the recognized objects.

For example, the controller 230 may recognize the hands of the users from the images and determine the form, the position, the motion, and the like, of the hand using a grayscale difference between adjacent pixels in order to determine whether the user is taking the gesture of putting up the hand, takes the gesture rolling the hand and putting the rolled hand to the mouth, and the like.

In addition, the controller 230 may perform a voice recognition for the voice that is received from the display apparatus 100 and the other display apparatus 300, respectively.

For example, the controller 230 may perform the voice recognition for the voices that are received from the display apparatus 100 and the other display apparatus 300, respectively, to determine whether the voices spoken of the user and the other party of the videotelephony include a specific keyword or a sentence. As another example, whether the voices of the user and the other party of the videotelephony correspond to a song having a constant pitch, and the like.

For example, in a case in which the voices that are received from the display apparatus 100 and the other display apparatus 300, respectively, are "high-five" or "let's high-five", because the corresponding voice includes a keyword "high-five", the controller 230 may determine that the respective users speak the voice "high-five".

For example, in a case in which the voices received from the display apparatus 100 and the other display apparatus 300, respectively, have the constant pitch, the controller 230 may determine that the corresponding voices correspond to the specific song.

Therefore, the controller 230 may determine whether the gesture taken by the user has the preset correlation with the spoken voice using the prestored information.

For example, it may be assumed that a determination may be made as to whether the voices received from the display apparatus 100 and the other display apparatus 300, respectively, correspond to a "high-five" and the user and the other party of the videotelephony may take the gestures of putting up the hand based on the images received from the display apparatus 100 and the other display apparatus 300, respectively. In this example, the controller 230 may determine that the gesture taken by the user of the display apparatus 100 has a preset correlation with a spoken voice and the gesture taken by the user of the other display apparatus 300 has a preset correlation with the spoken voice.

As another example, a determination may be made that the voices that are received from the display apparatus 100 and the other display apparatus 300, respectively, correspond to a specific song, and the user and the other party of the videotelephony may take the gestures of rolling the hand and putting the rolled hand to the mouth based on the images that are received from the display apparatus 100 and the other display apparatus 300, respectively. In this example, the controller 230 may determine that the gesture taken by the user of the display apparatus 100 may have a preset correlation with the spoken voice and the gesture taken by the user of the other display apparatus 300 may have the preset correlation with the spoken voice.

In this example, when the gestures and the spoken voices of the user and the other party of the videotelephony have the preset correlation, and the gesture and the spoken voice of the user have the same meaning as that of the other party of the videotelephony, the controller 230 may transmit the control instruction enabling the corresponding feedback to be output to the display apparatus 100 and the other display apparatus 300.

For example, the phrase of "have the same meaning" may refer to a case in which the user and the other party of the videotelephony may take the same gesture as each other, or the spoken voices of the user and the other party of the videotelephony may be the same or may include the same keyword or sentence as each other.

For example, in a case in which the user and the other party of the videotelephony make the same gesture of putting up the hand and saying "high-five" or "let's high-five", it may be determined that the gestures and the spoken voices of the user and the other party of the videotelephony have a preset correlation and have the same meaning as each other.

For example, when the gestures and the spoken voices of the respective users have a correlation, and the gestures and the spoken voices of the respective users have the same meaning as each other, the controller 230 may transmit the control instruction allowing the corresponding feedback to be output to the display apparatus 100 and the other display apparatus 300.

For example, the display apparatus 100 may output a feedback corresponding to the gesture and the spoken voice of the user having the correlation.

That is, the controller 120 may output the corresponding feedback based on the received control instruction.

For example, the display apparatus 100 may store information about the feedback corresponding to the gestures and the spoken voices having the correlation.

For example, the display apparatus 100 may map and store the information about the feedback corresponding to the corresponding gesture and the spoken voice, to each of the gestures and the spoken voices that have the correlation.

For example, the display apparatus 100 may map and store an animation emoticon in which the palms of user are high-fived or are high-fiving and the sound when the palms are high-fived, to the voice "high-five" and the gesture waving the hand, and may map and store an emoticon of a microphone form and the accompaniment of the corresponding song to a voice that is singing the song and the gesture of rolling the hand and putting the rolled hand to the mouth.

Therefore, if the controller 120 receives the control instruction from the server 200, the controller 120 may output the feedback corresponding to the control instruction among feedback mapped to each of the gesture and the spoken voice having the correlation.

For example, the control instruction may represent that the feedback corresponding to the vocalization of "high-five" and the gesture of putting up the hand is output is received from the server 200. In this example, the controller 120 may output the animation emoticon in which the palms of users are high-fived, and which are mapped to the voice "high-five" and the gesture of putting up the hand as the visual effect. Also, the controller 120 may output the sound when the palms are high-fived, as the sound effect.

Accordingly, the above-mentioned example describes the case in which the corresponding feedback is output while the gestures and the spoken voices of the user and the other party of the videotelephony have the same meaning as each other, but this is merely for purposes of example.

Accordingly, even in a case in which the gestures and the spoken voices of the user and the other party of the videotelephony do not have the same meaning as each other, as long as the gesture and the spoken voice of the other party of the videotelephony have the preset correlation, the controller 230 may transmit the control instruction enabling the corresponding feedback to be output to the display apparatus 100 and the other display apparatus 300.

For example, it may be assumed that the user of the other display apparatus 300 may take the gesture of rolling the hand and putting the rolled hand to the mouth while singing a song.

In this example, the controller 230 may transmit the control instruction allowing the feedback that is mapped to the voice singing the song and the gesture of rolling the hand and putting the rolled hand to the mouth to be output to the display apparatus 100, regardless of the gesture and the spoken voice of the user of the display apparatus 100.

Accordingly, the display apparatus 100 may output a GUI of a microphone form to the hand of the other party of the videotelephony as the visual effect and may output the accompaniment that fits with the corresponding song as the sound effect.

In addition, the above-mentioned example describes a case in which the corresponding feedback is output when the gestures and the spoken voices of the users have the preset correlation, but this is merely for purposes of example.

As another example, even in a case in which the gestures and the spoken voices of the users do not have the correlation, if the user takes a specific gesture and makes a specific comment, the controller 230 may transmit the control instruction allowing the corresponding feedback to be output to the display apparatus 100 and the other display apparatus 300.

For example, the user of the other display apparatus 300 may only sing a song without taking a gesture of rolling the hand and putting the rolled hand to the mouth.

In this example, even in a case in which the user of the other display apparatus 300 does not take the gesture of rolling the hand and putting the rolled hand to the mouth, the controller 230 may transmit the control instruction allowing the accompaniment that fits the song to be output as the sound effect.

As described below, various exemplary embodiments of the present invention will be described with reference to FIGS. 4 to 7.

Referring to FIGS. 4 to 7, the user 10 may perform the videotelephony with the user of the other display apparatus 300 through the display apparatus 100.

For example, the display apparatus 100 may display the image of the user that is photographed by the display apparatus 100 and the image of another party of the videotelephony that is photographed by the other display apparatus 300 in a PIP form, may transmit the spoken voice of the user that is obtained by the display apparatus 100 to the other display apparatus 300 through the server 200, and may receive and output the spoken voice of the other party of the videotelephony that is obtained by the other display apparatus 300 and that is transmitted by the other display apparatus 300 from the server 200.

Figure 4A:
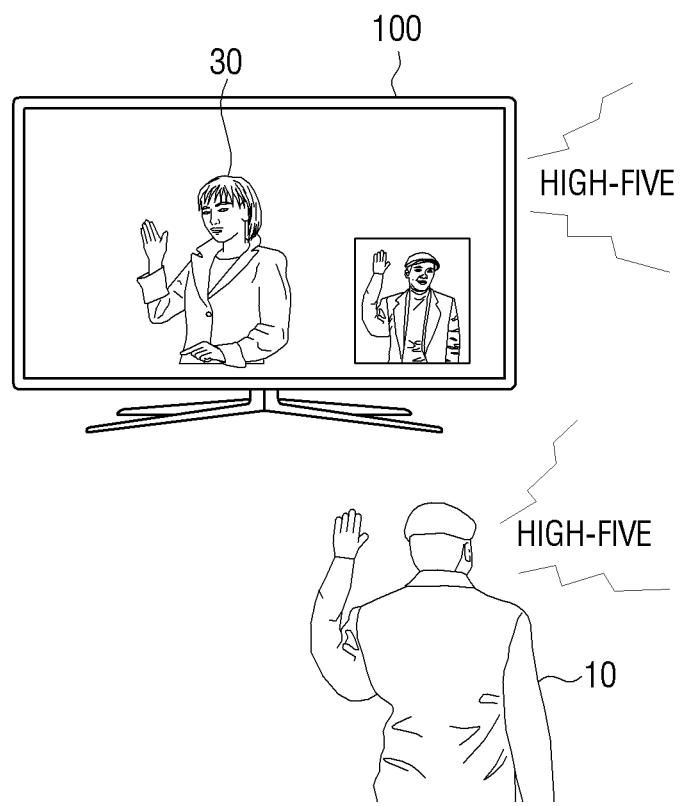
FIGS. 4A through 7B are diagrams illustrating a method for performing a videotelephony according to various exemplary embodiments.

For example, as shown in FIG. 4A, it is assumed that the user 10 and the other party 30 of the videotelephony take the gesture putting up the hand while speaking "high-five".

In this example, the display apparatus 100 may output feedback corresponding to a spoken voice of "high-five" and the gesture of putting up the hand in that the gestures and the spoken voices of the user 10 and the other party 30 of the videotelephony, respectively, have respective preset correlations. In this example, the gestures and the spoken voices of the user 10 and the other party 30 of the videotelephony have the same meaning.

Figure 4B:
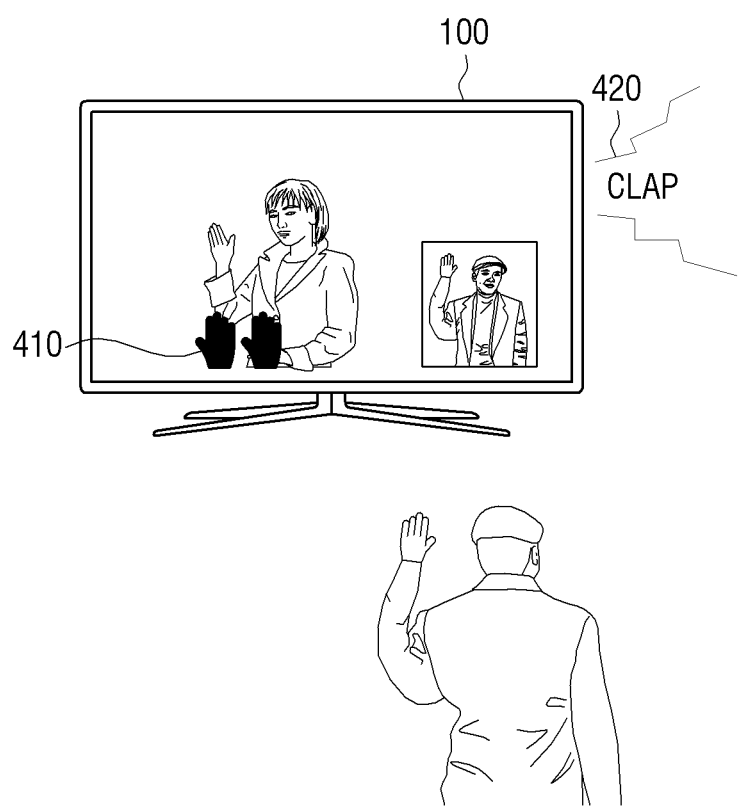

For example, as shown in FIG. 4B, the display apparatus 100 may display a GUI 410 including an animation emoticon form in which the palms are high-fiving with each other and may output a "clap" 420, indicating the sound when the palms are high-fived.

Figure 5A:
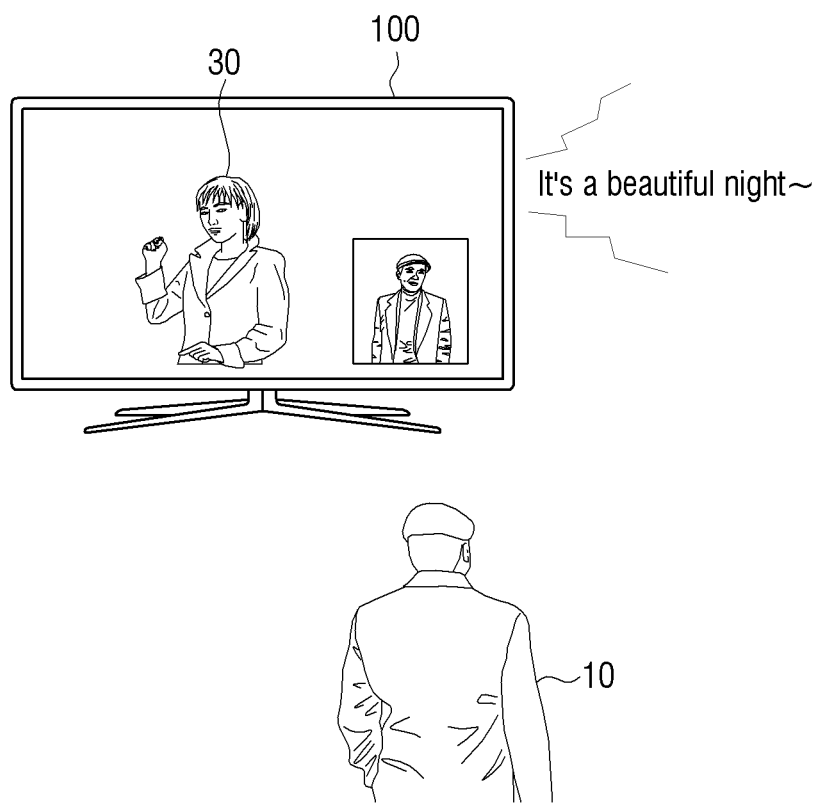

For example, as shown in FIG. 5A, it is assumed that the other party 30 of the videotelephony may make the gesture of rolling the hand and putting the rolled hand to the mouth while singing the song.

In this example, the display apparatus 100 may output the feedback corresponding to the spoken voice that is singing the song and the gesture of rolling the hand and putting the rolled hand to the mouth in that the gesture that is taken and the voice spoken by the other party 30 of the videotelephony may have the correlation, regardless of the gesture and the spoken voice of the user 10.

Figure 5B:
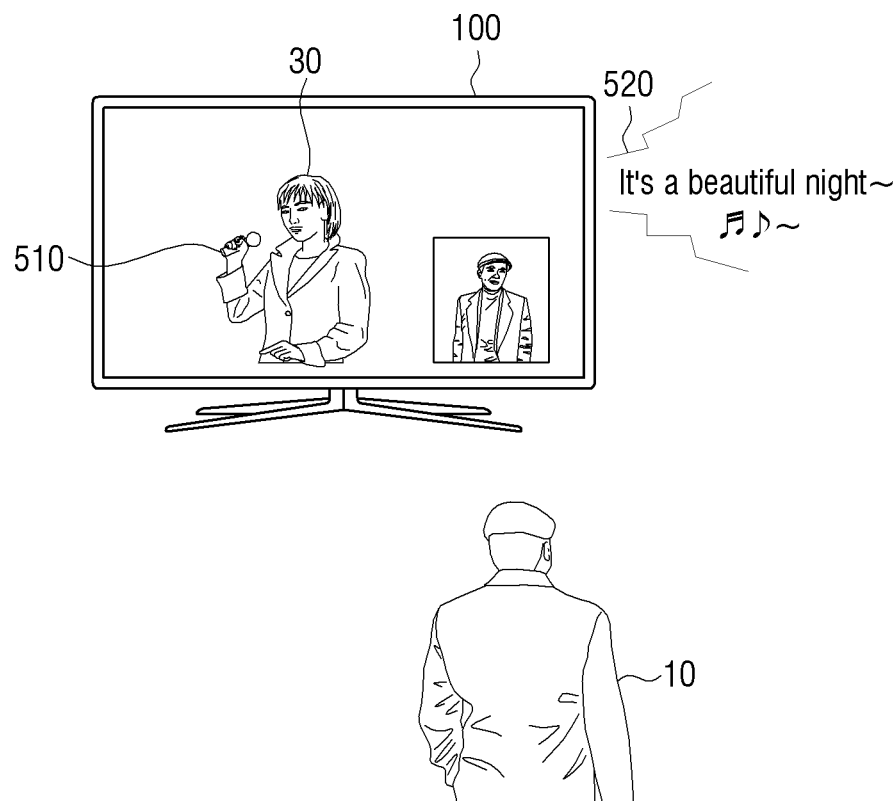

For example, as shown in FIG. 5B, the display apparatus 100 may display a GUI 510 of a microphone form to the hand of the other party 30 of the videotelephony and may output an accompaniment 520 that corresponds to the song that is sung by the user of the other display apparatus 300.

That is, according to various exemplary embodiments of the present invention, in the case in which the gesture and the spoken voice of the user have a preset correlation, the corresponding feedback may be output.

Figure 6A:
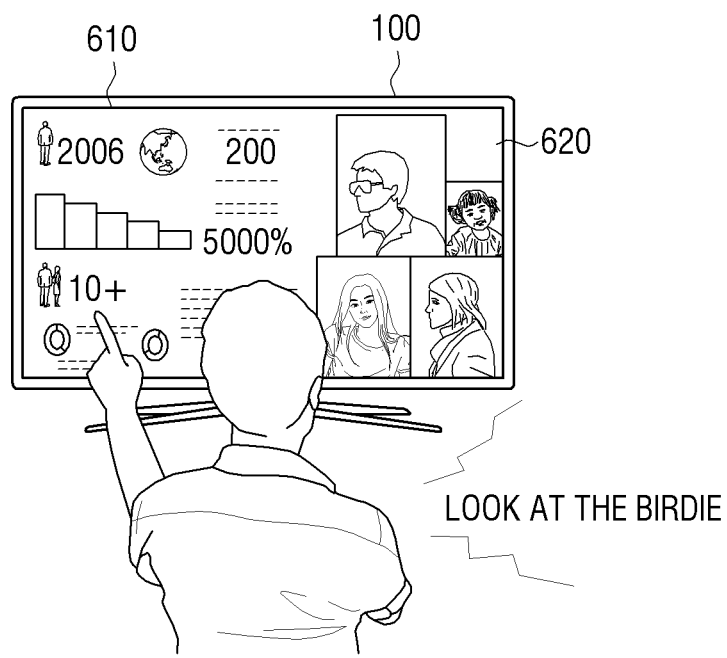

For example, as shown in FIG. 6A, the display apparatus 100 may divide the screen into two regions upon performing the videotelephony, may display an image 610 of the other party of the videotelephony on one region, and may display a contents screen 620 on the other region.

For example, the user 10 makes the comment "look at the birdie" and take a gesture of pointing out a specific point on the screen with a finger.

Figure 6B:
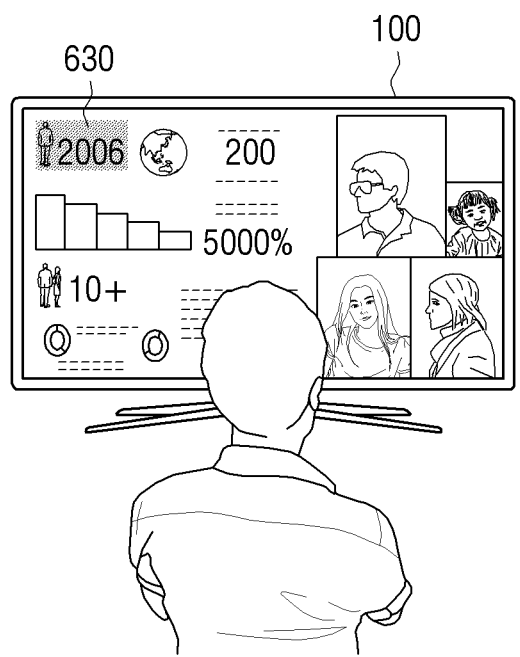

In this example, the display apparatus 100 may highlight 630 and display a point that is pointed out by the user as shown in FIG. 6B, in that the gesture and the spoken voice of the user 10 may have the preset correlation.

For example, the display apparatus 100 may transmit position information about the point that is pointed out on the contents screen by the user to the other display apparatus 300 through the server 200, and the other display apparatus 300 may highlight and display the same position as the point that is highlighted by the display apparatus 100 using the position information that is received from the server 200.

Also, this is merely an example, and the layout of the screen may also be changed according to a region in which the user's gaze settles.

Figure 7A:
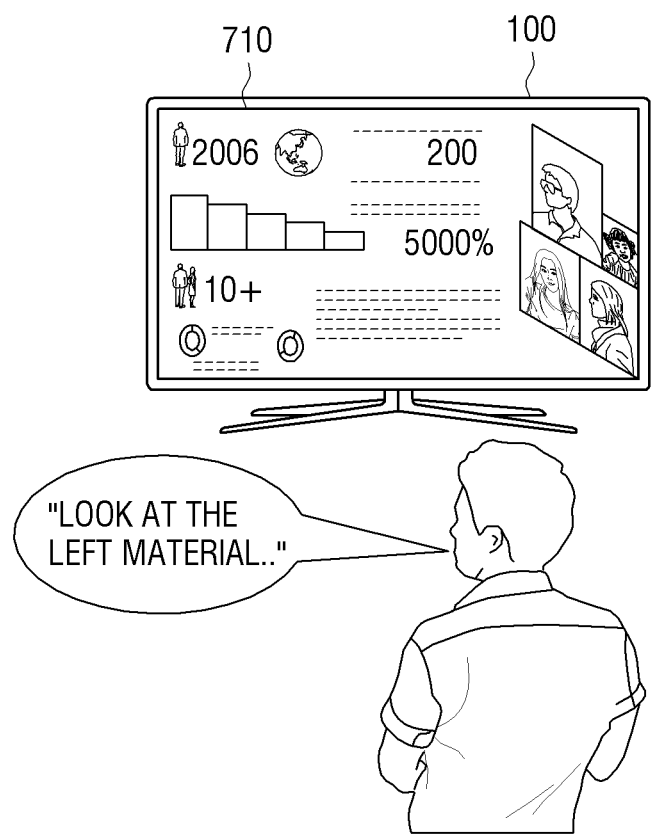
Figure 7B:
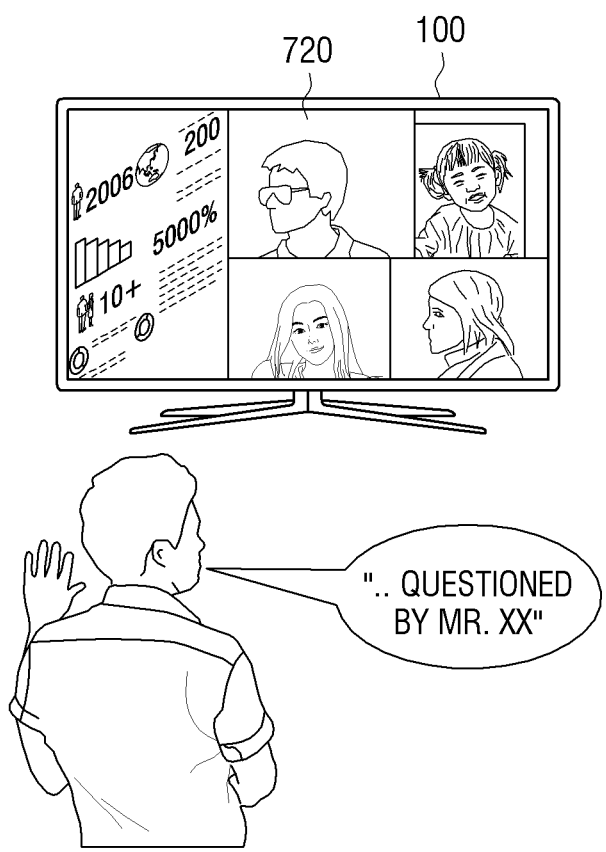

For example, in a case in which the user says "look at a left material ~" while viewing a content screen 710, the display apparatus 100 may expand the content screen and reduce the image of the other party of the videotelephony as shown in FIG. 7A. For example, in a case in which the user speaks while being questioned by Mr. XX" while viewing a videotelephony image 720, the display apparatus 100 may reduce the content screen and expand the image of the other party of the videotelephony as shown in FIG. 7B.

Accordingly, in the case in which the gesture and the spoken voice of the user have the preset correlation, the corresponding feedback may be output by taking account of the gaze of the user.

Figure 8:
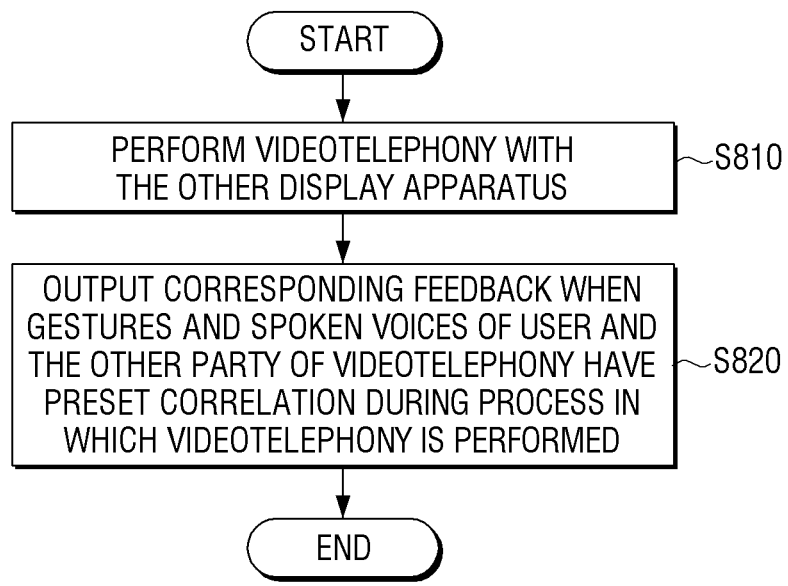
FIG. 8 is a flow chart illustrating a method for performing a videotelephony using a display apparatus according to an exemplary embodiment.

FIG. 8 is a flow chart illustrating a method for performing a videotelephony using a display apparatus according to an exemplary embodiment.

Referring to FIG. 8, the display apparatus performs the videotelephony with the other display apparatus (S810). For example, the display apparatus may include the camera photographing the user, the microphone obtaining the voice that is spoken by the user, the communicating unit performing communications with the server in order to receive the image that is obtained by photographing the other party of the videotelephony and the voice spoken by the other party of the videotelephony, the display displaying the image that is obtained by photographing the user and the image obtained by photographing the other party of the videotelephony, and the speaker outputting the spoken voice of the other party of the videotelephony.

In this example, if the gestures and the spoken voices of the user and the other party of the videotelephony have the preset correlation during a process in which the videotelephony is performed, the corresponding feedback is output (S820).

For example, the preset correlation may be a case in which the gesture corresponds to a gesture that has the meaning that is represented by the spoken voice. In addition, the feedback may include at least one of a visual effect and a sound effect that correspond to the gestures and the spoken voices of the user and the other party of the videotelephony.

For example, when the gestures and the spoken voices of the user and the other party of the videotelephony have a preset correlation, and the gesture and the spoken voice of the user have the same meaning as that of the other party of the videotelephony, the corresponding feedback may be output.

For example, the server may determine whether or not the gestures and the spoken voices of the user and the other party of the videotelephony have the preset correlation, and as a result of the determination, if there is the preset correlation, the server may transmit the control instruction for outputting the corresponding feedback to the display apparatus.

In this example, in S820, the corresponding feedback may be output based on the received control instruction.

Also, in S820, if it is determined whether or not the gesture and the spoken voice of the user, and the gesture and the spoken voice of the other party of the videotelephony that are received from the server have the preset correlation, and there is the preset correlation, the corresponding feedback may be output.

Meanwhile, in S820, in a case in which the gesture and the spoken voice of the user have the preset correlation, a feedback corresponding to a position at which user's gaze settles may be output. In this example, in S820, an image that is displayed at the position at which the user's gaze settles may be expanded and output.

For example, fun may be added to the videotelephony and an emotional communication may be performed in that the feedbacks corresponding to the gestures that are taken and the voices that are spoken by the users may be output together with each other at a time of performing the videotelephony.

Also, a non-transitory computer readable medium having a program stored therein may be provided. The medium may perform the program that sequentially performs the method for performing a videotelephony according to the present invention.

For example, the non-transitory computer readable medium may refer to a medium storing data for a short period such as a register, a cash, a memory, or the like, but may also include a machine-readable medium for permanently or semi-permanently storing the data. For example, various applications or programs may be stored and provided in the non-transitory computer readable medium such as a compact disc (CD), a digital versatile disk (DVD), a hard disk, a Blu-lay disk, a universal serial bus (USB), a memory card, a read-only memory (ROM), and the like.

In addition, although the bus is not shown in the block diagram described in above examples showing the display apparatus, communications between respective components in the display apparatus may be performed via the bus. In addition, the display apparatus may also further include processors such as a central processing unit (CPU), a microprocessor, and the like, that may perform various steps described above.

Hereinabove, although the exemplary embodiments of the present invention have been shown and described, it should be understood that the present invention is not limited to the disclosed exemplary embodiments and may be variously changed without departing from the spirit and the scope of the present invention. Therefore, the present invention should be construed as including all the changes, equivalents, and substitutions included in the spirit and scope of the present invention.

What is claimed is:

1. A display apparatus to perform videotelephony with another display apparatus comprising:
    a speaker configured to output a sound of a first user of the other display apparatus;
    a display configured to display an image of the first user; and
    a controller configured to determine whether or not at least one of a gesture and the sound of the first user and at least one of a gesture and a sound of a second user of the display apparatus have a preset correlation and, in response to determining that the preset correlation exists between at least one of the gesture and the sound of the second user and at least one of the gesture and the sound of the first user, control the at least one of the speaker and the display to output a corresponding feedback.

2. The display apparatus as claimed in claim 1, wherein the gesture and sound of the first user and the gesture and sound of the second user have the preset correlation, which corresponds to a gesture that has a meaning that is represented by the sound.

3. The display apparatus as claimed in claim 1, wherein the controller is configured to output the corresponding feedback when the gestures and sound of the first user have the same meaning as the gesture and sound of the second user.

4. The display apparatus as claimed in claim 1, further comprising:
a camera configured to photograph the second user;
a microphone configured to obtain a voice that is spoken by the second user; and
a communicating unit configured to perform communications with a server to receive an image that is obtained by photographing the first user and the sound that is spoken by the first user,
wherein the display is further configured to display an image that is obtained by photographing the second user.

5. The display apparatus as claimed in claim 4, wherein the server is configured to determine whether or not gestures and sounds of the first user and the second user have the preset correlation, and transmit a control instruction for outputting the corresponding feedback to the display apparatus in response to the gestures and the sounds of the first user and the second user being determined as having the preset correlation.

6. The display apparatus as claimed in claim 5, wherein the controller is configured to output the corresponding feedback based on the received control instruction.

7. The display apparatus as claimed in claim 4, wherein the controller is configured to determine whether or not the gesture and the sound of the second user and the gesture and the sound of the first user that are received from the server have the preset correlation, and output the corresponding feedback, in response to the gesture and the sound of the second user and the gesture and the sound of the first user received from the server having the preset correlation.

8. The display apparatus as claimed in claim 1, wherein the feedback comprises at least one of a visual effect and a sound effect that correspond to the gestures and the sounds of the first user and the second user.

9. The display apparatus as claimed in claim 1, wherein the controller is configured to output the corresponding feedback to a position of the display at which a gaze of the second user is located, in response to the gestures and the sounds of the first user and the second user having the preset correlation.

10. The display apparatus as claimed in claim 9, wherein the controller is configured to enlarge the image displayed at the position.

11. A controlling method of a display apparatus performing videotelephony with another display apparatus, the method comprising:
outputting, by a speaker, a sound of a first user of the other display apparatus;
displaying, by a display, an image of the first user;
determine whether or not at least one of a gesture and the sound of the first user and at least one of a gesture and a sound of a second user of the display apparatus have a preset correlation;
in response to the determining that the preset correlation exists between the at least one of the gesture and the sound of the first user and the at least one of the gesture and the sound of the second user, controlling at least one of the speaker and the display to output a corresponding feedback.

12. The method as claimed in claim 11, wherein the gesture and sound of the first user and the gesture and the sound of the second user have the preset correlation, which is a gesture that has a meaning that is represented by the sound.

13. The method as claimed in claim 11, wherein the feedback is output, in response to the gesture and sound of the first user have the same meaning as the gesture and the sound of the second user.

14. The method as claimed in claim 11, wherein the display apparatus comprises:
a camera configured to photograph the second user;
a microphone configured to obtain a voice that is spoken by the second user; and
a communicating unit configured to communicate with a server and to receive an image that is obtained by photographing the first user and the sound that is spoken by the first user.

15. The method as claimed in claim 14, further comprising:
determining whether or not the gestures and the sounds of the first user and the second user have the preset correlation; and
transmitting a control instruction for outputting the corresponding feedback to the display apparatus in response to the gestures and the sounds of the first user and the second user being determined as having the preset correlation.

16. The method as claimed in claim 15, wherein the outputting of the corresponding feedback is performed based on the received control instruction.

17. The method as claimed in claim 14, wherein the outputting of the corresponding feedback comprises:
determining whether or not the gesture and the sound of the second user and the gesture and the sound of the first user that are received from the server have the preset correlation, and in response to the gesture and the sound of the second user and the gesture and the sound of the first user received from the server being determined to have the preset correlation, outputting the corresponding feedback.

18. The method as claimed in claim 11, wherein the feedback comprises at least one of a visual effect and a sound effect that correspond to the gestures and the sound of the first user and the second user.

19. The method as claimed in claim 11, wherein, the outputting comprises outputting the corresponding feedback to a position of the display apparatus at which a gaze of the second user is located.

20. The method as claimed in claim 19, wherein the outputting comprises enlarging the image displayed at the position.

21. A controlling method of a display apparatus performing videotelephony with another display apparatus, the method comprising:
performing the videotelephony with the other display apparatus;
determining whether a preset correlation exists between at least one of gesture and speech received by the display apparatus with at least one of gesture and speech received by the other display apparatus;
in response to the determining that the preset correlation exists, outputting the same corresponding feedback during the videotelephony;

wherein the same corresponding feedback comprises a sound indicating the at least one of the gesture and the sound received by the display apparatus.

22. The method as claimed in claim 21, wherein the corresponding feedback is output to the display apparatus and the other display apparatus.

* * * * *